US012664380B1

(12) United States Patent
Jayaprakash et al.

(10) Patent No.: US 12,664,380 B1
(45) Date of Patent: Jun. 23, 2026

(54) RADIO FREQUENCY IDENTIFIER TAG UNIT OPERATION

(71) Applicant: QUALCOMM Incorporated, San Diego, CA (US)

(72) Inventors: Ajay Vignesh Jayaprakash, San Diego, CA (US); Kiran Patil, San Diego, CA (US); Bhupesh Manoharlal Umatt, San Diego, CA (US); Sheng-Yuan Tu, San Diego, CA (US); Feilu Liu, San Diego, CA (US); Scott Hoover, Del Mar, CA (US); Chetan Jagdeesh Bharadwaj, Erie, CO (US); Rishav Rej, Pleasanton, CA (US); Huang Lou, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/039,446

(22) Filed: Jan. 28, 2025

(51) Int. Cl.
*G06K 7/10* (2006.01)

(52) U.S. Cl.
CPC ..... *G06K 7/10227* (2013.01); *G06K 7/10217* (2013.01)

(58) Field of Classification Search
CPC ...................... G06K 7/10227; G06K 7/10217
See application file for complete search history.

(56) References Cited

U.S. PATENT DOCUMENTS

| | | | |
|---|---|---|---|
| 11,200,387 B1 * | 12/2021 | Stanford | ............ G06K 7/10217 |
| 2007/0205865 A1 * | 9/2007 | Rofougaran | ............ H04W 4/18 |
| | | | 340/572.1 |
| 2008/0318683 A1 * | 12/2008 | Rofougaran | .......... A63F 13/212 |
| | | | 463/39 |
| 2010/0127875 A1 * | 5/2010 | Wong | ........................ H04Q 9/00 |
| | | | 340/8.1 |
| 2017/0017874 A1 * | 1/2017 | Park | ................. G06K 19/07796 |

FOREIGN PATENT DOCUMENTS

| | | | | |
|---|---|---|---|---|
| EP | 1884880 A2 * | 2/2008 | ........... | G06K 7/0008 |
| WO | WO-2025016543 A1 * | 1/2025 | ......... | G06K 19/0723 |

* cited by examiner

*Primary Examiner* — Tuyen K Vo
(74) *Attorney, Agent, or Firm* — Harrity & Harrity LLP

(57) ABSTRACT

In some aspects, a reader may transmit, to one or more radio frequency identifier (RFID) tags, a continuous wave in accordance with a unit operation, wherein the unit operation is associated with one or more of an amount of time or a number of unit steps associated with one or more RFID sessions or one or more RFID sub-sessions. The reader may receive, from each of the one or more RFID tags, a response during the unit operation. Numerous other aspects are described.

20 Claims, 9 Drawing Sheets

400
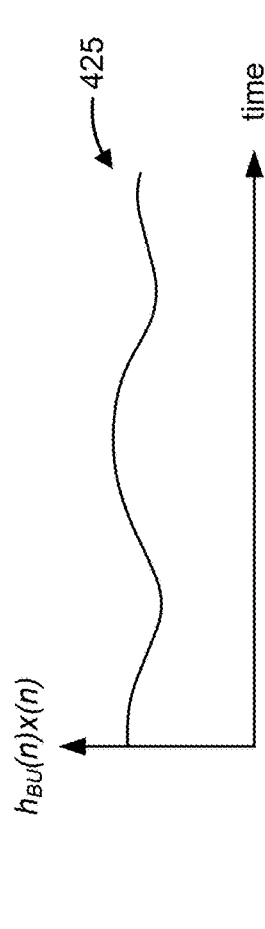
$h_{BU}(n)x(n)$
425
time
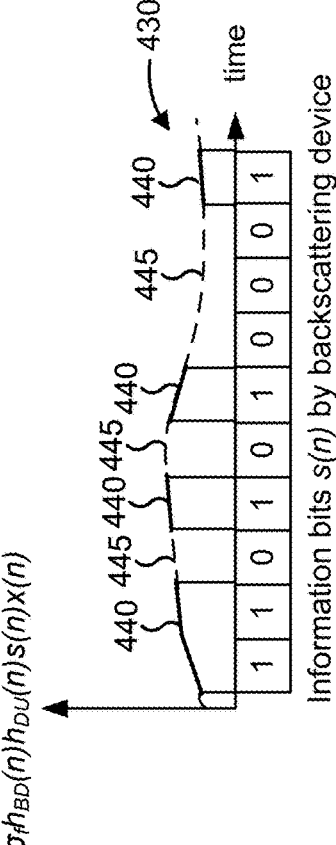
$\sigma h_{BD}(n)h_{DU}(n)s(n)x(n)$
430
440  445  440  445  440          440    445    440
| 1 | 1 | 1 | 0 | 1 | 1 | 0 | 1 | 0 | 0 | 0 | 1 |
Information bits $s(n)$ by backscattering device
time
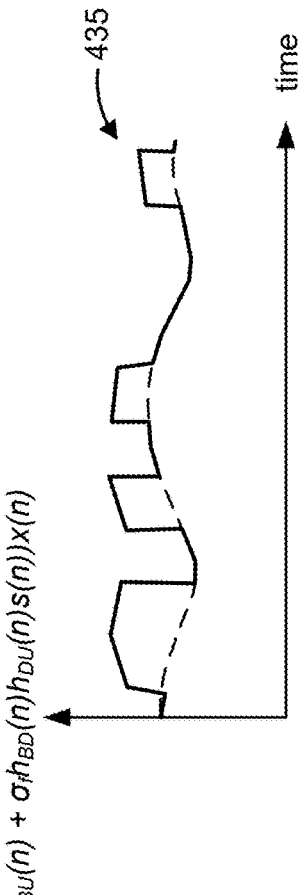
$(h_{BU}(n) + \sigma h_{BD}(n)h_{DU}(n)s(n))x(n)$
435
time
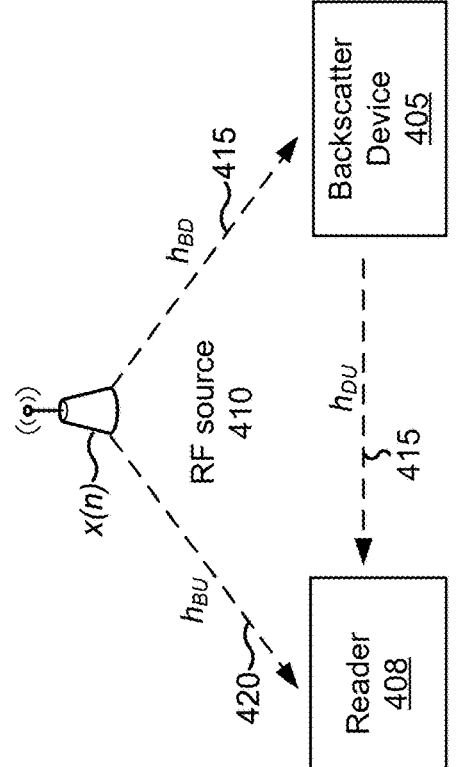
$x(n)$
$h_{BU}$
420
$h_{BD}$
415
RF source
410
$h_{DU}$
415
Reader
408
Backscatter
Device
405
FIGURE 4

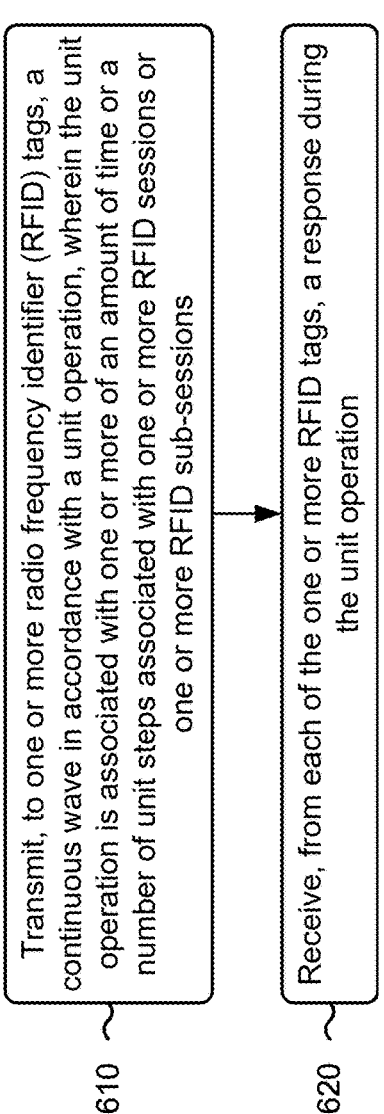

600

610 Transmit, to one or more radio frequency identifier (RFID) tags, a continuous wave in accordance with a unit operation, wherein the unit operation is associated with one or more of an amount of time or a number of unit steps associated with one or more RFID sessions or one or more RFID sub-sessions 620 Receive, from each of the one or more RFID tags, a response during the unit operation

FIG. 6

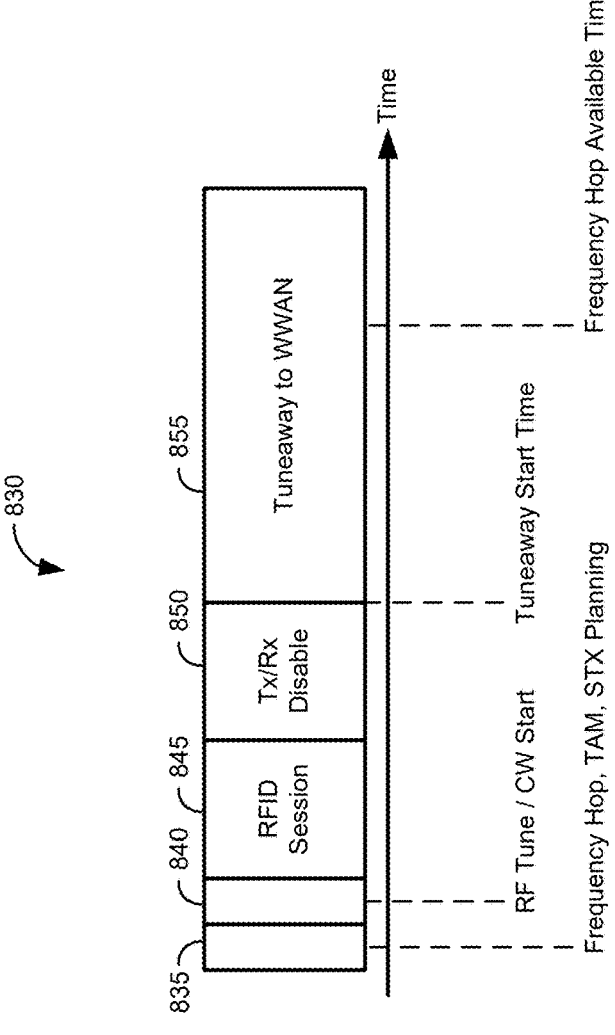
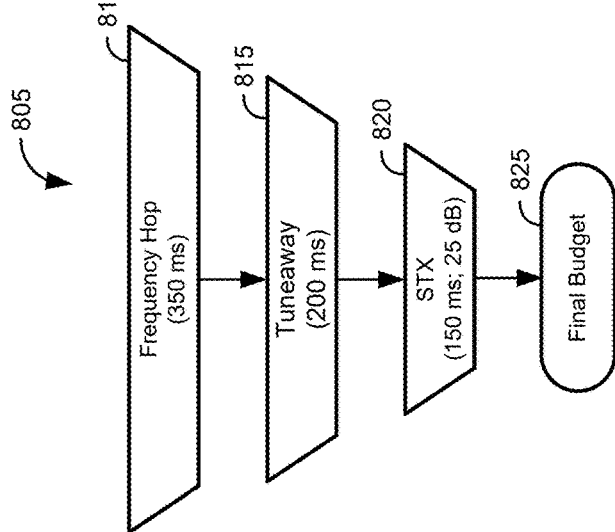
FIG. 8

RADIO FREQUENCY IDENTIFIER TAG UNIT OPERATION

FIELD OF THE DISCLOSURE

Aspects of the present disclosure generally relate to radio frequency identifier (RFID) tag communication and, for example, to communicating with RFID tags in accordance with a unit operation.

BACKGROUND

In a wireless communication system, a reader may communicate with an RFID tag. The reader and RFID tag may exchange information during various operations. For example, the reader may transmit or broadcast a signal to one or more RFID tags, and the RFID tags may respond to the signal from the reader. In some wireless communication systems, the reader may transmit a continuous wave that energizes the RFID tag. The RFID tag may power itself using the continuous wave and reply to the reader while energized by the continuous wave.

SUMMARY

Some aspects described herein relate to a reader for wireless communication. The reader may include one or more memories and one or more processors coupled to the one or more memories. The one or more processors may be configured to transmit, to one or more radio frequency identifier (RFID) tags, a continuous wave in accordance with a unit operation. The unit operation may be associated with one or more of an amount of time or a number of unit steps associated with one or more RFID sessions or one or more RFID sub-sessions. The one or more processors may be configured to receive, from each of the one or more RFID tags, a response during the unit operation.

Some aspects described herein relate to a method of wireless communication performed by a reader. The method may include transmitting, to one or more RFID tags, a continuous wave in accordance with a unit operation. The unit operation may be associated with one or more of an amount of time or a number of unit steps associated with one or more RFID sessions or one or more RFID sub-sessions. The method may include receiving, from each of the one or more RFID tags, a response during the unit operation.

Some aspects described herein relate to an apparatus for wireless communication. The apparatus may include means for transmitting, to one or more RFID tags, a continuous wave in accordance with a unit operation. The unit operation may be associated with one or more of an amount of time or a number of unit steps associated with one or more RFID sessions or one or more RFID sub-sessions. The apparatus may include means for receiving, from each of the one or more RFID tags, a response during the unit operation.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with backscatter communications.

FIG. 6 is a flowchart of an example process associated with a unit operation for RFID tag communication, in accordance with the present disclosure.

FIG. 8 is a diagram illustrating an example associated with an example RFID session with constraints, in accordance with the present disclosure.

DETAILED DESCRIPTION

Figure 1:
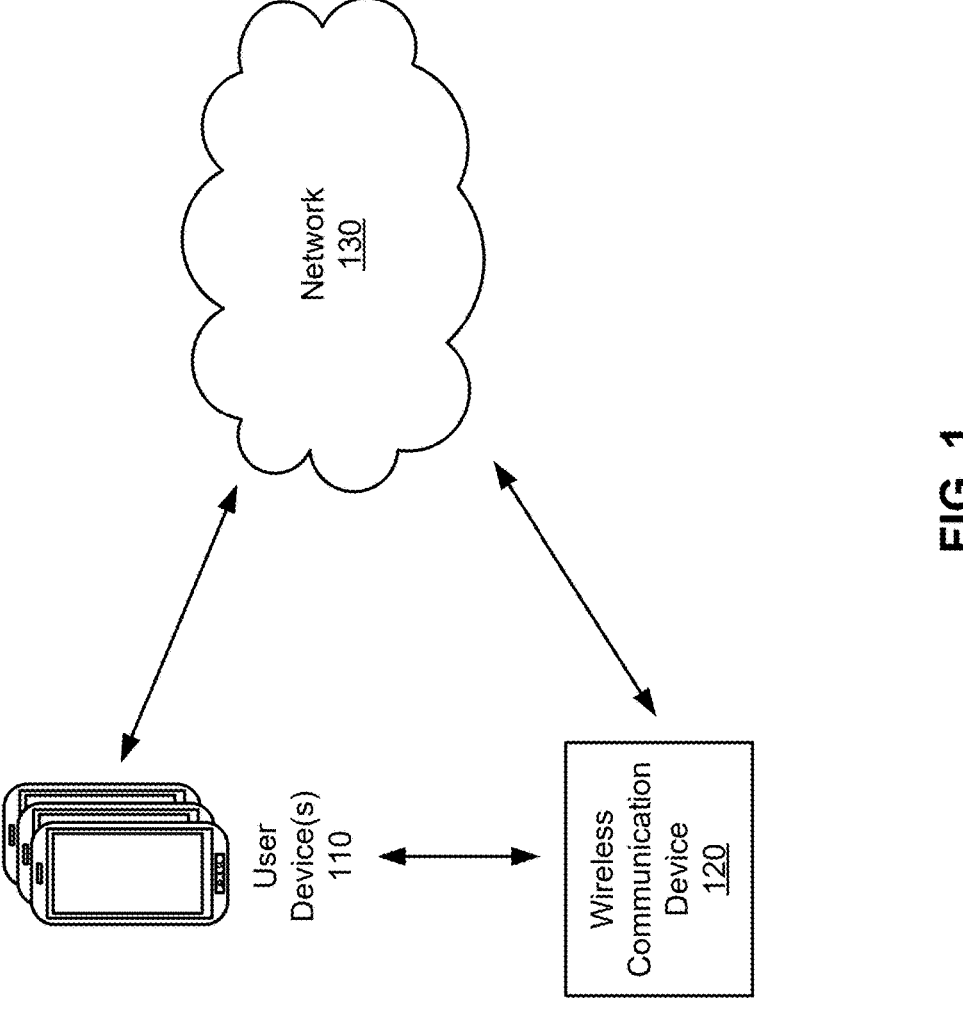
FIG. 1 is a diagram of an example environment in which systems and/or methods described herein may be implemented.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A radio frequency identifier (RFID) protocol may include operations having varying durations. For example, a first operation may include a message sequence where a reader transmits a select and/or challenge message to one or more RFID tags ("tags") to select a subset of the RFID tags that need to respond to the select and/or challenge message.

An example single-tag read sequence for communication between a reader and a single tag may be as follows:

$$Query \rightarrow RN16 \rightarrow ACK \rightarrow EPC$$

where Query and an acknowledgement (ACK) are transmitted from the reader to an individual tag. The Query may be the initial select and/or challenge message. The RN16 message may be a 16-bit random number transmitted from the tag to the reader in response to the Query message. The ACK may be transmitted by the reader to the tag in response to the RN16 message. The EPC may be an electronic program code transmitted from the tag to the reader in response to the ACK.

An example multi-tag read sequence for communication between a reader and multiple tags may be as follows:

$$QueryRep \rightarrow RN16 \rightarrow ACK \rightarrow EPC$$

where QueryRep may be a command broadcast by the reader to instruct tags that are already in a specific inventory state (e.g., a reply state) to adjust their state or respond. The tags indicated by the QueryRep command may transmit the RN16 message, and the reader may transmit the ACK in response to each RN16 message received. Each tag that receives the ACK may reply with the EPC message.

A duration of the single-tag read sequence and the multi-tag read sequence may be different from one another. For example, a duration of the single-tag read sequence may range from 1.2 ms to 50 ms. A duration of the multi-tag read sequence may range from 1.2 ms to 50 ms, plus, for each tag, an additional 0.5 ms to 41 ms. Further, for both a single-tag read sequence and the multi-tag read sequence, a tag may need up to 1.5 ms to power up before the reader may transmit a command (e.g., a Query message or a QueryRep message).

Some RFID protocols may define requirements for frequency channel duration, frequency hopping, interference mitigation, and/or a combination thereof, among other examples. The requirements set by some RFID protocols may interfere with RFID operations such as the single-tag read sequence and/or the multi-tag read sequence. For example, the requirements of some RFID protocols may not provide a sufficient amount of time for the RFID operation to be completed, which may cause the RFID operation to be interrupted. Interrupting the RFID operation may leave one or more tags in an undefined and/or unknown (to the reader) state. In some instances, interrupting the RFID operation may leave a tag in an unrecoverable state.

In some aspects, rather than allowing the RFID operation to be randomly interrupted, RFID operations may be divided into one or more unit operations. Each unit operation may be defined in accordance with an amount of time and/or a number of steps for an RFID operation. For example, each unit operation may be defined so that the tag is not left inoperable or in an undefined and/or unknown (to the reader) state if the RFID operation is interrupted after completion of a unit operation. Further, the reader may be configured to only initiate a unit operation if the unit operation is likely to be completed before the RFID operation is interrupted. As a result, the reader may always know the states of the tags, and the tags may always be in a recoverable state even if the RFID operation is interrupted.

FIG. 1 is a diagram of an example environment 100 in which systems and/or methods described herein may be implemented. As shown in FIG. 1, environment 100 may include one or more user devices 110 (e.g., one or more RFID tags), a wireless communication device 120 (e.g., a reader), and a network 130. Devices of environment 100 may interconnect via wired connections, wireless connections, or a combination of wired and wireless connections.

The user devices 110 may include one or more devices capable of receiving, generating, storing, processing, and/or providing information associated with unit operations for RFID communication with the wireless communication device 120, as described elsewhere herein. Each of the user devices 110 may include a communication device and/or a computing device. For example, each of the user devices 110 may include a wireless communication device, an RFID tag, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The wireless communication device 120 may include one or more devices capable of receiving, generating, storing, processing, and/or providing information associated with unit operations for RFID communications with the one or more user devices 110. For example, the wireless communication device 120 may include an RFID reader (e.g., a "reader"), a base station, an access point, and/or the like. Additionally, or alternatively, wireless communication device 120 may include a communication and/or computing device, such as a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 130 may include one or more wired and/or wireless networks. For example, the network 130 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 130 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
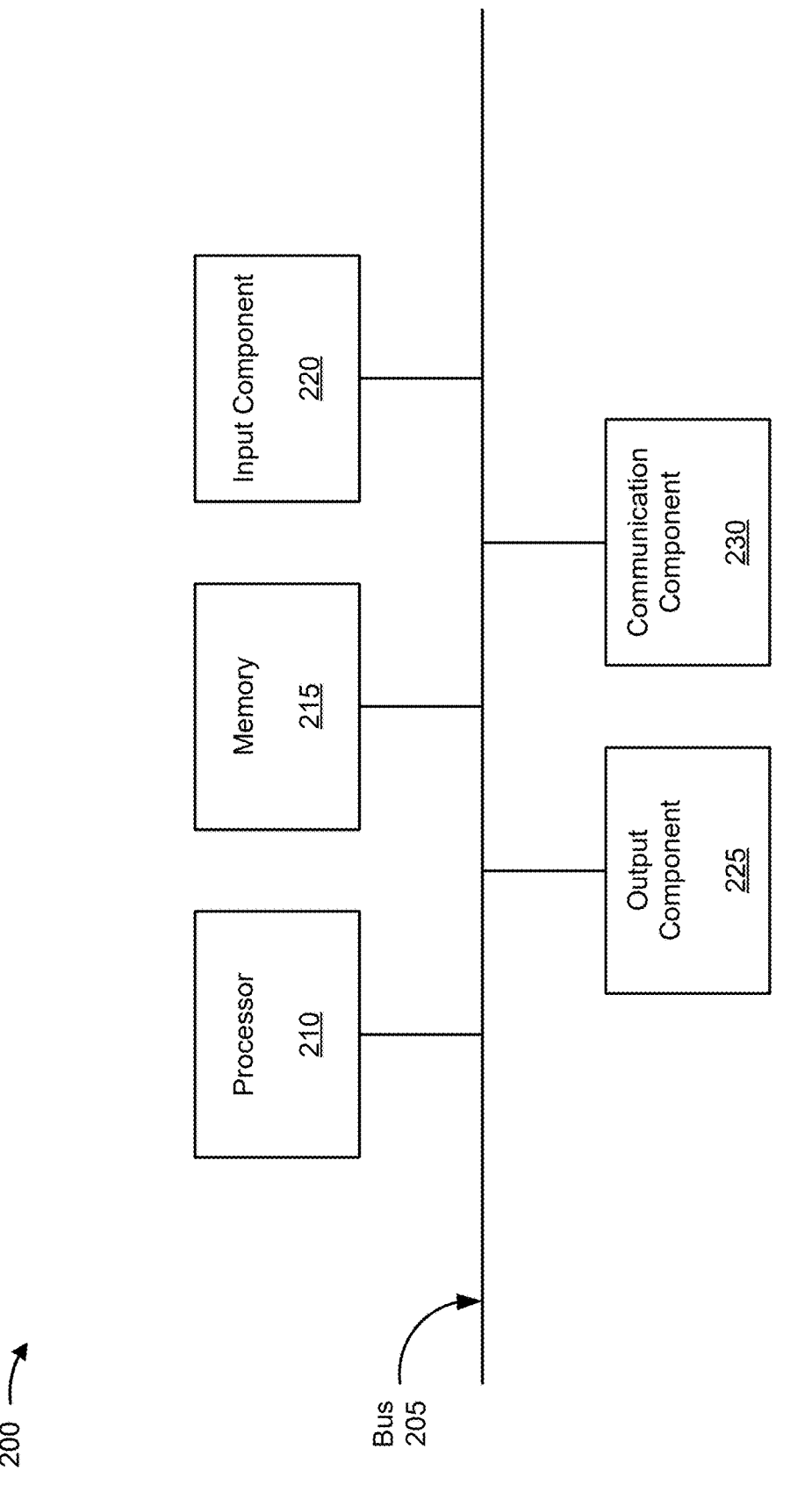
FIG. 2 is a diagram illustrating example components of a device, in accordance with the present disclosure.

FIG. 2 is a diagram illustrating example components of a device 200, in accordance with the present disclosure. The device 200 may correspond to an RFID tag and/or a reader. In some aspects, the RFID tag and/or the reader may include one or more devices 200 and/or one or more components of the device 200. As shown in FIG. 2, the device 200 may include a bus 205, a processor 210, a memory 215, an input component 220, an output component 225, and a communication component 230.

The bus 205 may include one or more components that enable wired and/or wireless communication among the components of the device 200. The bus 205 may couple together two or more components of FIG. 2, such as via operative coupling, communicative coupling, electronic coupling, and/or electric coupling. For example, the bus 205 may include an electrical connection (e.g., a wire, a trace, and/or a lead) and/or a wireless bus. The processor 210 may include a central processing unit, a graphics processing unit, a microprocessor, a controller, a microcontroller, a digital signal processor, a field-programmable gate array, an application-specific integrated circuit, and/or another type of processing component. The processor 210 may be implemented in hardware, firmware, or a combination of hardware and software. In some aspects, the processor 210 may include one or more processors capable of being programmed to perform one or more operations or processes described elsewhere herein.

The memory 215 may include volatile and/or nonvolatile memory. For example, the memory 215 may include random access memory (RAM), read only memory (ROM), a hard disk drive, and/or another type of memory (e.g., a flash memory, a magnetic memory, and/or an optical memory). The memory 215 may include internal memory (e.g., RAM, ROM, or a hard disk drive) and/or removable memory (e.g., removable via a universal serial bus connection). The memory 215 may be a non-transitory computer-readable medium. The memory 215 may store information, one or more instructions, and/or software (e.g., one or more software applications) related to the operation of the device 200. In some aspects, the memory 215 may include one or more memories that are coupled (e.g., communicatively coupled) to one or more processors (e.g., processor 210), such as via the bus 205. Communicative coupling between a processor 210 and a memory 215 may enable the processor 210 to read and/or process information stored in the memory 215 and/or to store information in the memory 215.

The input component 220 may enable the device 200 to receive input, such as user input and/or sensed input. For example, the input component 220 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 225 may enable the device 200 to provide output, such as via a display, a speaker, and/or a light-emitting diode. The communication component 230 may enable the device 200 to communicate with other devices via a wired connection and/or a wireless connection. For example, the communication component 230 may include a receiver, a transmitter, a transceiver, a modem, a network interface card, and/or an antenna.

The device 200 may perform one or more operations or processes described herein. For example, a non-transitory computer-readable medium (e.g., memory 215) may store a set of instructions (e.g., one or more instructions or code) for execution by the processor 210. The processor 210 may execute the set of instructions to perform one or more operations or processes described herein. In some aspects, execution of the set of instructions, by one or more processors 210, causes the one or more processors 210 and/or the device 200 to perform one or more operations or processes described herein. In some aspects, hardwired circuitry may be used instead of or in combination with the instructions to perform one or more operations or processes described herein. Additionally, or alternatively, the processor 210 may be configured to perform one or more operations or processes described herein. Thus, aspects described herein are not limited to any specific combination of hardware circuitry and software.

In some aspects, device 200 may include means for transmitting, to one or more RFID tags, a continuous wave in accordance with a unit operation. The unit operation may be associated with one or more of an amount of time or a number of unit steps associated with one or more RFID sessions or one or more RFID sub-sessions. The device 200 may further include mans for receiving, from each of the one or more RFID tags, a response during the unit operation. In some aspects, the means for device 200 to perform processes and/or operations described herein may include one or more components of device 200 described in connection with FIG. 2, such as bus 205, processor 210, memory 215, input component 220, output component 225, and/or communication component 230.

The number and arrangement of components shown in FIG. 2 are provided as an example. The device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
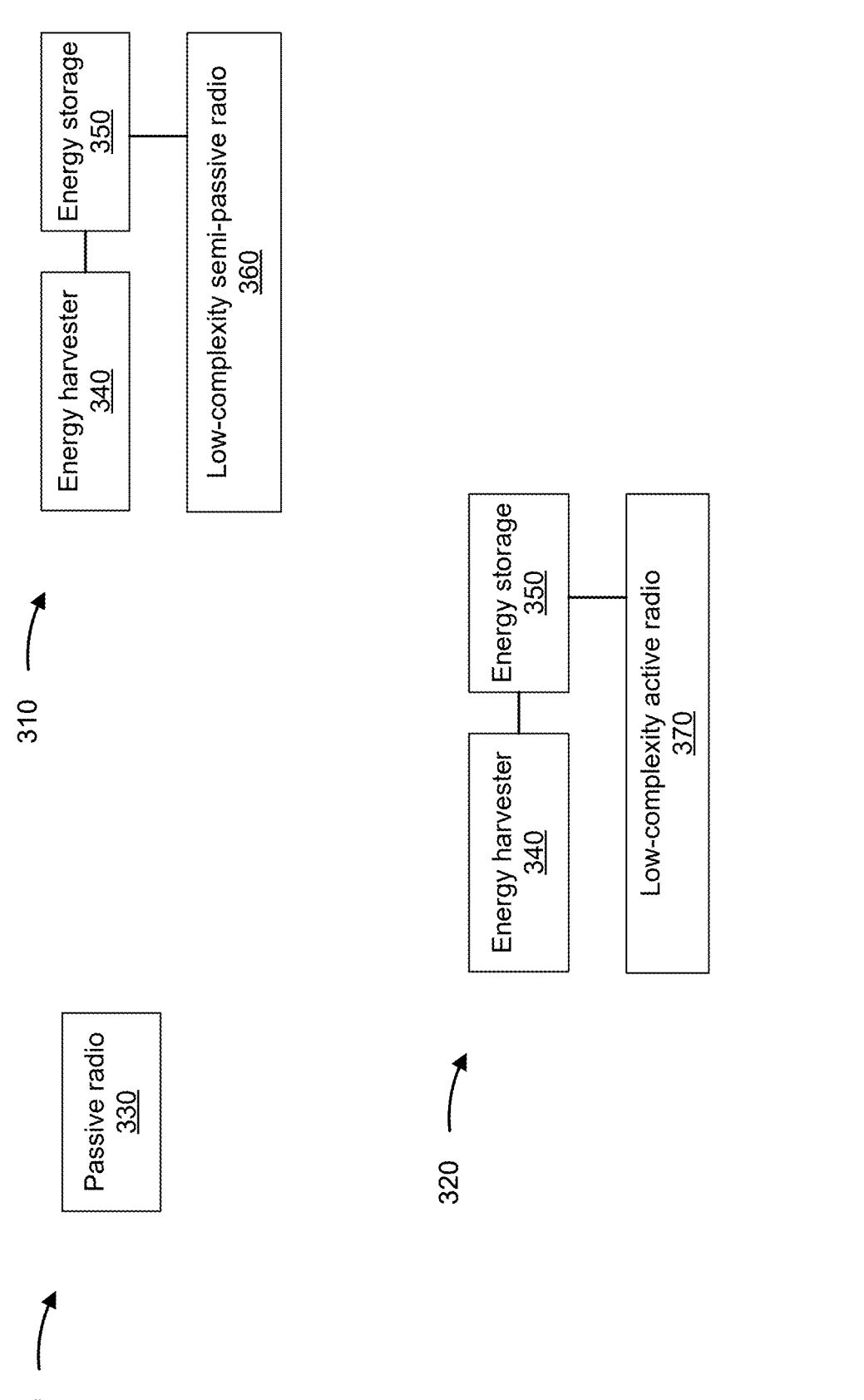
FIG. 3 is a diagram illustrating examples associated with different types of radio frequency identifier (RFID) tags.

FIG. 3 is a diagram illustrating examples 300, 310, and 320 associated with different types of RFID tags.

Example 300 illustrates components of a passive RFID tag. As shown, passive RFID tags may include a passive radio 330. For example, the passive radio 330 may be configured to backscatter a carrier wave.

Example 310 illustrates components of a semi-passive RFID tag. As shown, semi-passive RFID tags may include an energy harvester 340, an energy storage 350, and/or a low-complexity semi-passive radio 360. For example, the low-complexity semi-passive radio 360 may be configured to harvest energy from a carrier wave (also called a "continuous wave") using the energy harvester 340, store energy from a carrier wave using the energy storage 350, and/or backscatter a carrier wave.

Example 320 illustrates components of an active RFID tag. As shown, active RFID tags may include an energy harvester 340, an energy storage 350, and/or a low-complexity (for example, low-cost) active radio 370. For example, the low-complexity active radio 370 may be configured to harvest energy from a carrier wave using the energy harvester 340, store energy from a carrier wave using the energy storage 350, and/or backscatter a carrier wave.

RFID tags may be categorized into at least three types of devices: device 1, device 2a, and device 2b. Device 1 type RFID tags may include at least some passive and/or semi-passive devices. A device 1 type RFID tag may have approximately 1 u W peak power consumption, support energy storage, use an initial sampling frequency offset (SFO) up to 10X ppm (for example, where X can be any suitable value), and communicate uplink transmissions by backscattering externally-provided carrier waves.

Device 2a type RFID tags may include at least some semi-passive devices, and device 2b type RFID tags may include active devices. Both device 2a and device 2b type RFID tags may have less than or equal to a few hundred u W peak power consumption, support energy storage, and use an initial SFO up to 10X ppm. A device 2a type RFID tag may communicate uplink transmissions by backscattering externally-provided carrier waves. A device 2b type RFID tag may communicate uplink transmissions by internally generating the uplink transmission.

In some examples, device 1, device 2a, and/or device 2b type RFID tags that are located indoors may support a maximum distance of 10-50 m, a range which may be sub-selected. In Topology 1 (for example, in which an RFID tag may directly and bidirectionally communicate with one or more readers) and in Topology 2 (for example, in which an RFID tag may communicate bidirectionally with an intermediate node between the RFID tag and a reader), device 1, device 2a, and/or device 2b type RFID tags may not support radio resource control (RRC) states, mobility (for example, cell-selection/re-selection-like functionality), automatic repeat request (ARQ), or hybrid ARQ (HARQ).

FIG. 4 is a diagram illustrating an example 400 associated with backscatter communications.

Some wireless communication devices may be considered IoT devices, such as RFID tags (sometimes referred to as ultra-light IoT devices), or similar IoT devices. In ambient IoT, a terminal (for example, an RFID device, a tag, or a similar device) may not include a battery, and the terminal may accumulate energy from radio signaling. To achieve further cost reduction and zero-power communication, wireless networks may utilize a type of RFID tag referred to as an "ambient backscatter device" or a "backscatter device."

As shown in FIG. 4, a backscatter device 405 (for example, a tag or a sensor, among other examples), which may be one example of an RFID tag such as a passive, semi-passive, or active RFID tag described with regard to FIG. 3, may employ a simplified hardware design (for example, including a power splitter, an energy harvester, and a microcontroller) that does not include a battery, such that the backscatter device 405 relies on energy harvesting for power, and that does not include a radio wave generation circuit, such that the backscatter device 405 is capable of transmitting information only by reflecting a radio wave. More particularly, the backscatter device 405 communicates with a reader 408 (for example, a UE, a network node, or another network device) by modulating a reflecting radio signal from an RF source 410 (for example, a network node, a UE, or another network device). In some examples, the RF source 410 and the reader 408 may be the same device and/or may be co-located. For example, in some instances, the reader 408 and the RF source 410 may be associated with the same network node.

To facilitate communication of the backscatter device 405, the RF source 410 may transmit an energy harvesting wave to the backscatter device 405. The energy harvesting wave may be transmitted for a sufficient duration in order to enable a communication phase for a target range between the reader 408 and the backscatter device 405. Additionally or alternatively, in some instances, a range between the RF source 410 and the backscatter device 405 may be limited by a minimum received power for triggering energy harvesting at the backscatter device 405, such as −20 decibel milliwatts (dBm).

Once energy is sufficiently accumulated at the backscatter device 405, the backscatter device 405 may begin to reflect the radio wave that is radiated onto the backscatter device 405 via a backscatter link 415. For example, the RF source 410 may initiate a communication session (sometimes referred to as a query-response communication) with a query, which may be a modulating envelope of a carrier wave. The backscatter device 405 may respond by backscattering of the carrier wave. The communication session may include multiple rounds, such as for purposes of contention resolution when multiple backscatter devices respond to a query. A channel between the RF source 410 and the backscatter device 405 of the backscatter link 415 may be associated with a first backscatter link channel response value (sometimes referred to as a first backscatter link channel coefficient or a first backscatter link gain value), hBD. As described below, the backscatter device 405 may have reflection-on periods and reflection-off periods that follow a pattern that is based at least in part on the transmission of information bits by the backscatter device 405. The reader 408 may detect the reflection pattern of the backscatter device 405 and obtain the backscatter communication information via the backscatter link 415. A channel between the reader 408 and the backscatter device 405 of the backscatter link 415 may be associated with a second backscatter link channel response value (sometimes referred to as a second backscatter link channel coefficient or a second backscatter link channel gain value), hDU. In addition, the RF source 410 and the reader 408 may communicate (for example, reference signals and/or data signals) via a direct link 420. A channel between the RF source 410 and the reader 408 of the direct link 420 may be associated with a direct link channel response value (sometimes referred to as a direct link channel coefficient or a direct link channel gain value), hBU.

Thus, the resulting signal received at the reader 408, which is the superposition of the signal received via the direct link 420 and the signal received via the backscatter link 415, may be denoted as y(n). This signal, y(n), is shown by reference number 435. As shown, when s(n)=0 (indicated by reference number 440 in the plot shown at reference number 430), the backscatter device 405 may switch off reflection, and thus the reader 408 receives only the direct link 420 signal. When s(n)=1 (indicated by reference number 445 in the plot shown at reference number 430), the backscatter device 405 may switch on reflection, and thus the reader 408 receives a superposition of both the direct link 420 signal and the backscatter link 415 signal. To receive the information bits transmitted by the backscatter device 405, the reader 408 may first decode x(n) based at least in part on the direct link channel response value of hBU(n) by treating the backscatter link 415 signal as interference. The reader 408 may then detect the existence of the signal component.

Figure 5:
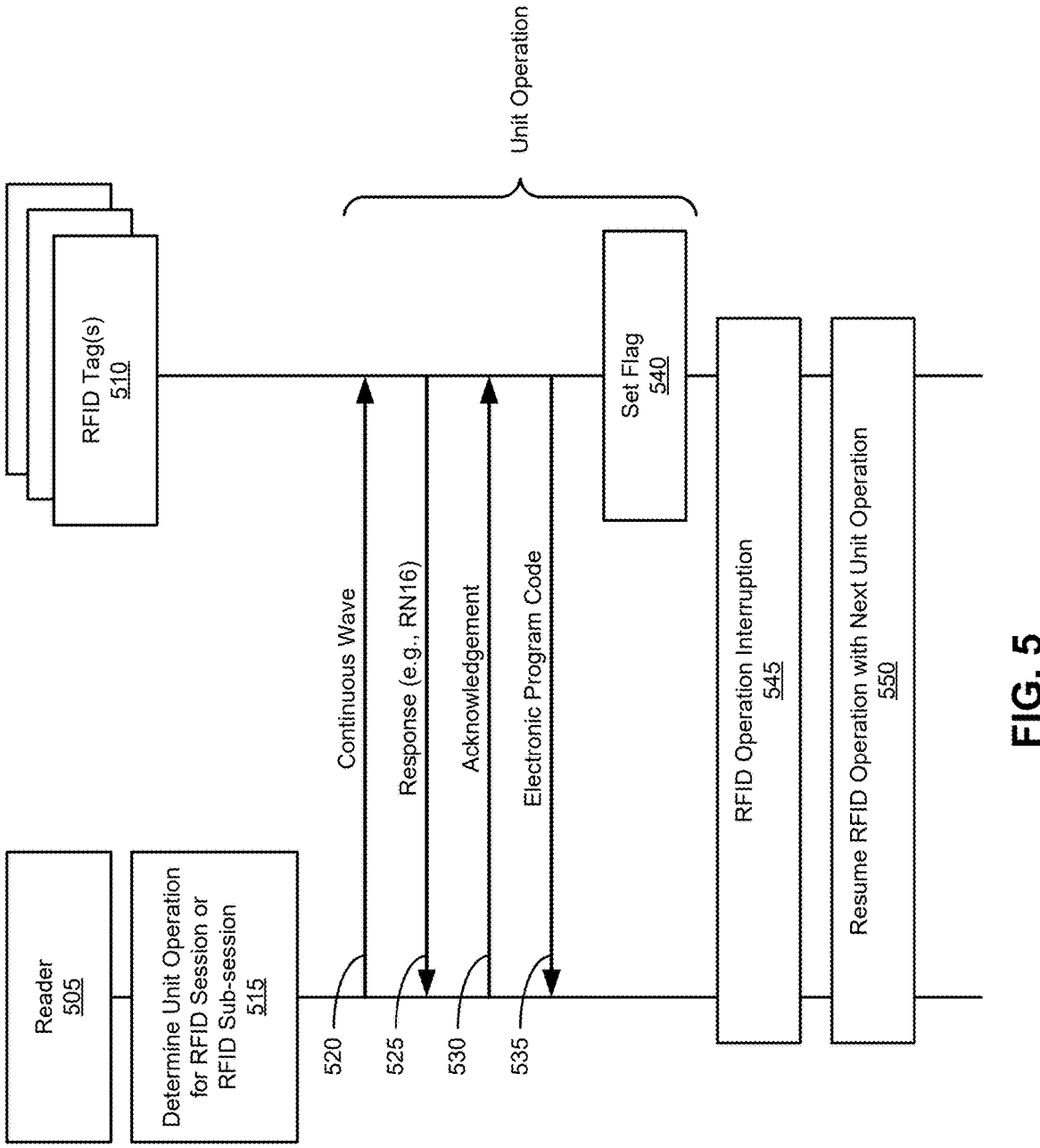
FIG. 5 is a diagram illustrating an example associated with RFID communication between an RFID tag and a reader, in accordance with the present disclosure.

FIG. 5 is a diagram illustrating an example 500 associated with RFID communication between an RFID tag and a reader, in accordance with the present disclosure. As shown in FIG. 5, a reader 505 (e.g., a wireless communication device 120) and one or more RFID tags 510 (e.g., one or more user devices 110) may communicate with one another.

As shown by reference number 515, the reader 505 may determine one or more unit operations for an RFID session or an RFID sub-session. The RFID session or RFID sub-session may be part of an RFID operation such as an RFID tag inventory operation, an RFID tag access operation, and/or a combination thereof, among other examples. In some aspects, the unit operation may be associated with an amount of time or a number of unit steps associated with the one or more RFID sessions and/or one or more RFID sub-sessions. In some aspects, the one or more RFID sessions or the one or more RFID sub-sessions may include a single tag inventory search, a multi-tag inventory search, a single tag access procedure, a multi-tag access procedure, and/or a combination thereof, among other examples.

As shown by reference number 520, the reader 505 may transmit, and the one or more RFID tags 510 may receive, a continuous wave in accordance with the unit operation. For example, the reader 505 may transmit the continuous wave for at least a duration associated with the unit operation. In some aspects, the reader 505 may transmit the continuous wave for at least an amount of time associated with the unit operation. In some aspects, the amount of time in which the reader 505 transmits the continuous wave corresponds to a number of steps in the unit operation.

As shown by reference number 525, the reader 505 may receive, and the one or more RFID tags 510 may transmit, a response. In some aspects, the response is an RN16 message transmitted in response to the continuous wave. In some aspects, the response is transmitted while the one or more RFID tags 510 are receiving the continuous wave. For example, the one or more RFID tags 510 may transmit the response using a backscatter link.

As shown by reference number 530, the reader 505 may transmit, and one or more of the RFID tags 510 may receive, an acknowledgement (ACK). The ACK May indicate that the reader 505 received the response (e.g., RN16) from one or more of the RFID tags 510.

As shown by reference number 535, one or more RFID tags 510 may transmit, and the reader 505 may receive, an electronic program code. Each RFID tag 510 that transmits the electronic program code may transmit the electronic program code in response to the ACK received from the reader 505.

As shown by reference number 540, each RFID tag 510 that transmitted the electronic program code to the reader 505 may set a flag. In some aspects, the flag set by each RFID tag 510 may be associated with one or more commands associated with the unit operation, the RFID session, the RFID sub-session, and/or a combination thereof, among other examples.

As shown by reference number 545, the RFID operation may be interrupted. For example, the RFID operation may be interrupted because of a constraint associated with frequency hopping, a global navigation satellite system (GNSS), a physical layer consideration, a throughput consideration, a WWAN consideration, a transmission power consideration, or a thermal consideration.

As shown by reference number 550, the reader 505 and the RFID tags 510 may resume the RFID operation. For example, in some aspects, the reader 505 may initiate a next unit operation associated with the RFID operation. Because the RFID operation interruption occurred after a previous unit operation had been completed, the RFID tags 510 are not left in an unknown, undefined, and/or unrecoverable state. Accordingly, the reader 505 and the RFID tags 510 may resume the RFID operation with the next unit operation.

In some aspects, determining the one or more unit operations may include determining one or more radio frequency parameters, determining the amount of time or the number of unit steps for the unit operation in accordance with the one or more radio frequency parameters, determining the amount of time or the number of unit steps for the one or more RFID sessions or the one or more RFID sub-sessions, determining a desired transmission power in accordance with one or more physical layer conditions, determining a transmission frequency and a dwell time, determining a final duration and a transmission power for the unit operation, and/or a combination thereof, among other examples.

For example, with respect to constraints associated with frequency hopping, which may cause the RFID operation to be interrupted, the reader 505 may be configured to determine a maximum dwell time and/or interruption time in accordance with one or more regulatory requirements corresponding to suspending RFID operations (e.g., suspending transmission of a continuous wave) and retuning or hopping to another available channel. In some aspects, the reader 505 may determine a read time (e.g., a T_bar time) if all channels are exhausted. In some aspects, upper layer signaling may be used to configure only a subset of channels by reducing hopping channel separation (e.g., the upper layer may specify using 200 kHz channels instead of using 500 kHz channels). Complying with upper layer requests, tracking frequency hopping channels across multiple RFID sessions, and suspending and/or resuming RFID operations for channel hopping may result in an interrupted RFID session that leaves one or more RFID tags 510 in an unknown, undefined, and/or unrecoverable state. Accordingly, determining the one or more unit operations in accordance with frequency hopping constraints may allow frequency hopping to interrupt the RFID operation without leaving the one or more RFID tags 510 in an unknown, undefined, and/or unrecoverable state.

Other constraints may relate to GNSS, physical layer, and/or throughput, considerations. For example, if a GNSS band is interfered with due to an RFID transmission, the RFID transmitter may need to reduce a backscatter link frequency. Physical layer conditions that may affect the successful completion of RFID operations may include a low signal-to-noise ratio (SNR) and/or a low received signal strength indicator (RSSI), retransmissions for inventor and/or access commands due to cyclic redundancy check (CRC) failures, a tag rate and/or a throughput rate being below a target threshold, retransmissions for inventor and/or access commands due to a T1 and/or T2 timer expiration, and/or a combination thereof, among other examples. In accordance with the GNSS, physical layer, and/or throughput constraints, an RF mode table parameter selection may need to occur or reoccur, which may interrupt the RFID operation. Determining the one or more unit operations in accordance with the GNSS, physical layer, and/or throughput constraints (e.g., determining the unit operations such that the unit operations occur between RF mode table parameter selections) can prevent the one or more RFID tags 510 from being left in an unknown, undefined, and/or unrecoverable state.

In some aspects, the reader 505 may consider wireless wide area network (WWAN) constraints. WWAN may permit a user device (e.g., user device 110) to operate in a single radio mode, a dual radio mode, and/or a dual subscriber identity module (SIM) dual active (DSDA) mode. For user devices operating in the single radio mode, a tuneaway (e.g., a process for switching between different RATs) may occur between RFID and WWAN, which may interrupt one or more RFID operations. By determining one or more unit operations for an RFID operation, the tuneaways may occur between unit operations, so that the one or more RFID tags are not left in an unknown, undefined, and/or unrecoverable state.

In some aspects, the reader 505 may determine the unit operations in accordance with transmission power criteria, thermal criteria, and/or a combination thereof, among other examples. For example, for RFID operations, a specific absorption rate (SAR) requirement may limit transmission power. Additionally or alternatively, thermal mitigation may also limit transmission power. Additionally or alternatively, a maximum transmission power may be limited by upper layer signaling. Limitations and/or constraints associated with transmission power and thermal criteria may result in disrupted RFID operations that leave one or more RFID tags in an unknown, undefined, and/or unrecoverable state. Accordingly, by defining the unit operations to accommodate interruptions in RFID operations caused by transmission power criteria and/or thermal criteria, the one or more RFID tags may be in a known and/or defined state when the RFID operation is interrupted. Other constraints that may be considered by the reader 505 when determining the unit operations may include a GNSS conflict start, a stop request from an upper layer, exhaustion of a simultaneous transmission budget, a voice call on a WWAN (e.g., TRM_unlock_immediate), and/or a combination thereof, among other examples.

In some aspects, the reader 505 may determine the unit operation in accordance with other criteria in addition to, or as an alternative to, the constraints discussed above. For example, in some aspects, the reader 505 may determine the unit operation in accordance with a radio frequency mode table configuration (e.g., a backscatter link frequency, a time reference interval, a modulation index, and/or a combination thereof, among other examples). In some aspects, the reader 505 may determine the unit operation to include a time period for signal retransmissions, including communication retries and/or other communications associated with communication failures. In some aspects, the reader 505 may determine the unit operation to include a time period for transmitting a select command to the one or more RFID tags 510.

In some aspects, the reader 505 may determine the unit operation in accordance with multiple criteria and/or constraints. For example, in some aspects, the reader 505 may select one or more radio frequency mode parameters from an upper layer configuration corresponding to GNSS constraints, physical layer constraints, and/or a combination thereof, among other examples.

In some aspects, the reader 505 may determine a minimum time for the unit operation and a nominal time for an entire RFID session, an RFID sub-session, and/or an RFID operation (which may include one or more RFID sessions and/or RFID sub-sessions). In some aspects, the reader 505 may determine the minimum time and/or the nominal time in accordance with one or more radio frequency mode parameters. For example, when the minimum time for the unit operation is determined, the reader 505 may add a margin to account for an amount of time associated with tuning and/or starting a radio frequency transmission, a continuous wave warmup (e.g., a 2 ms margin for one or more RFID tags 510 to warm up before the reader 505 issues commands), disabling a transmission, stopping reception of a sample streaming, retries and/or retransmissions of failed communications, and/or a combination thereof, among other examples. When the minimum time is determined, the reader 505 may determine the nominal time as a scaled value of the minimum time in accordance with the number of unit operations needed for the RFID operation. For example, for a read operation that takes 63 ms to read 1000 bytes, where the 1000 bytes are in segments of 128 bits, the number of segments may be rounded to 63

$$\left( e.g., 62.5 = \frac{(1000 \text{ bytes} * 8 \text{ bits})}{128 \text{ bits}} \right).$$

Accordingly, the nominal time (e.g., $T_{nominal}$) for the read operation may be defined as follows:

$$T_{nominal} = T_{min} + 62 * T_{min}$$

12 where $T_{min}$ is the amount of time for the inventory RFID session and one segment read (e.g., one RFID sub-session).

In some aspects, the reader 505 may determine $T_{min}$, $T_{nominal}$, and a transmission power preference ($Tx_{PowerPref}$) as part of a preparation session for communication with the one or more RFID tags 510 in accordance with one or more unit operations. During the preparation session, the reader 505 may select and/or adjust one or more parameters in accordance with physical layer conditions, GNSS conflicts, and/or a combination thereof, among other examples.

The preparation session may include determining a margin ($T_{RFMargin}$) as the sum of a margin for RF tuning ($T_{RFtune}$), a warmup time ($T_{CWWarmup}$), a time to disable transmissions ($T_{TxDisable}$), and/or a combination thereof, among other examples. Accordingly, the margin may be determined as follows:

$$T_{RFMargin} = T_{RFtune} + T_{CWWarmup} + T_{TxDisable}.$$

The preparation session may further include determining a minimum unit operation time ($T_{MinUnitOp}$), which may be a minimum amount of time for one unit operation. The minimum unit operation time may be an amount of time for the unit operation ($T_{UnitOperation}$) multiplied by a scaling factor (ScalingFactor$_{ReTx}$), which may be a constant to allow time for retransmissions, as follows:

$$T_{MinUnitOperation} = T_{UnitOperation} \times \text{ScalingFactor}_{ReTx}.$$

The minimum amount of time for a unit operation ($T_{min}$) may be the sum of the margin plus the minimum unit operation time, determined as follows:

$$T_{min} = T_{MinUnitOperation} + T_{RFMargin}.$$

As part of the preparation session, as discussed above, the reader 505 may determine the total amount of time for an RFID operation (e.g., $T_{Nominal}$). The total amount of time for the RFID operation may be a sum of all minimum unit operation times for the unit operations of the RFID operation, with each minimum unit operation time being multiplied by a constant associated with a number of unit operations to be performed ($No_{UnitOp}$), plus the margin. For example, the total amount of time for the RFID operation may be defined as follows:

$$T_{Nominal} = (T_{MinUnitOp1} \times No_{UnitOp1}) + (T_{MinUnitOp2} \times No_{UnitOp2}) + \ldots + (T_{MinUnitOpn} \times No_{UnitOpn}) + T_{RFMargin}.$$

As discussed above, the preparation session may further include determining a transmission power preference ($Tx_{PowerPref}$). The transmission power preference may be determined in accordance with a maximum transmission power signaled from an upper layer, a desired reader range (e.g., 1.5 m, 2 m, 10 m) for the RFID operation, a desired power for the RFID operation in accordance with one or more channel conditions or a tag rate, a transmission power limit associated with active thermal mitigation (e.g., in accordance with a temperature sensor output), and/or a combination thereof, among other examples. Accordingly, in some aspects, the reader 505 may set a desired transmission power in accordance with one or more physical layer conditions, a maximum transmission power, thermal mitigation, and/or a combination thereof, among other examples.

In some aspects, the reader 505 may determine the unit operation in accordance with a tag state for each of the one or more RFID tags 510. For example, the reader 505 may determine the unit operation such that completing the one or more RFID sessions and/or RFID sub-sessions associated with the unit operation will leave the one or more RFID tags 510 in an operable and/or known state.

In some aspects, the reader 505 may determine the unit operation in accordance with one or more radio frequency parameters. The one or more radio frequency parameters may include a transmission frequency, a dwell time, an RFID session window, a transmission power, and/or a combination thereof, among other examples, as discussed herein. In some aspects, the reader 505 may determine the transmission frequency and the dwell time in accordance with a regulation and/or upper layer configuration. In some aspects, the reader 505 may determine an RFID session window that avoids concurrency with a WWAN operation. In some aspects, the reader 505 may determine a transmission power and/or transmission duration for the RFID session and/or RFID sub-session in accordance with one or more simultaneous transmission and/or thermal constraints. In some aspects, the reader 505 may determine a final duration and/or transmission power for the RFID session and/or RFID sub-session. Additionally, in some aspects, the reader 505 may suspend and/or resume RFID sessions and/or RFID-sub-sessions in accordance with a pending procedure status, WWAN tuneaways, a frequency hopping pattern, upper layer signaling interrupting the RFID operation, and/or a combination thereof, among other examples.

For example, with respect to WWAN concurrency planning, WWAN operations may include scheduled activities such as idle discontinuous reception (DRX) page wakeups. In some aspects, if the WWAN is in a connected mode, a transmitting receiving module (TRM) priority duty cycle may be running, to periodically switch priority to a WWAN network. The reader 505 may use information associated with scheduled and/or upcoming tuneaways to plan one or more RFID sessions or RFID sub-sessions in accordance with the unit operation associated with the one or more RFID sessions and/or RFID sub-sessions.

With respect to simultaneous transmission, which may facilitate total time averaged radio frequency exposure regulatory compliance for multiple radio technologies, the reader 505 may periodically (e.g., approximately every 500 ms) run an outer loop to allocate a transmission budget dynamically for all active radios during a communication window. Even if simultaneous transmission is disabled, regulatory compliance may still be necessary, which means that the reader 505 may wait a wait time until transmission can begin again. Accordingly, for RFID session planning, the reader 505 may determine if a current transmission budget allows the transmission power for the nominal and/or requested time to complete the RFID operation. Alternatively or additionally, the reader 505 may determine whether one or more user operations may be scheduled in accordance with an allowed transmission power and whether an end of the RFID session and/or RFID sub-session can be aligned to a next offset length start boundary, which may be associated with a new transmission budget, to continue the RFID session and/or RFID sub-session. Alternatively or additionally, if simultaneous transmission is not enabled or the offset length alignment is not preferable, the reader 505 may determine whether the minimum unit operation time can be met for a given power preference.

In some aspects, the reader 505 may determine the unit operation in accordance with a radio frequency mode (e.g., backscatter link frequency, a time reference interval, a modulation index, and/or a combination thereof, among other examples). In some aspects, the radio frequency mode may be based on a desired read rate and/or range communicated to the reader 505 by one or more of the RFID tags 510. In some aspects, the radio frequency mode may be adjusted in real time to account for one or more signal quality measurements such as SNR, RSSI, a packet error rate, available computing resources for concurrent communication with other network devices, and/or a combination thereof, among other examples.

In some aspects, the reader 505 may determine the unit operation in accordance with a sum of multiple time periods. Each of the multiple time periods may correspond to one or more RFID sessions and/or or one or more RFID sub-sessions. In some aspects, the reader 505 may calculate a final minimum time associated with each unit operation. If a select command is needed for the unit operation, the reader 505 may add a time period for the select command to the unit operation. For example, for an RFID session associated with an inventory procedure (8.0 ms) including transmission of a select command and receipt of an electronic program code (e.g., 4.4 ms) for radio frequency mode 1, the reader 505 may define the unit operation to be 12.4 ms (e.g., 4.4 ms+8.0 ms=12.4 ms). In another example, for an RFID session associated with reading 128 bits for a tag in a ready state (16.9 ms) and transmission of a select command and receipt of an electronic program code (4.4 ms), the reader 505 may determine the unit operation to be 21.3 ms (e.g., 16.9 ms+4.4 ms=21.3 ms).

In some aspects, the reader 505 may determine the unit operation in accordance with one or more sessions. The one or more sessions may include the preparation session (discussed above), a TRM acquisition session, a planning session, an evaluation session, a radio frequency tune session, an active session, a session suspend operation, and/or a combination thereof, among other examples. The TRM acquisition session may include determining that the one or more RFID tags 510 receive a hardware resource lock in case of WWAN concurrency, as discussed above. The planning session may include determining a wait time and/or available time for evaluations associated with frequency hopping, tuneaways, simultaneous transmission, and/or a combination thereof, among other examples. The evaluation session may include scheduling one or more RFID sessions and/or one or more RFID sub-sessions. In some aspects, a sleep and/or low power mode may also be scheduled if a wait time is sufficient (e.g., over 100 ms) to save power before performing the preparation session and/or the radio frequency tune session. The radio frequency tune session may include tuning the radio frequency and enabling the continuous wave for a fixed transmission power, after the planning session and the evaluation session, to determine the final transmission power and duration for the one or more RFID sessions and/or RFID sub-sessions. The active session may include the reader 505 actively interacting with the one or more RFID tags 510, including transmitting commands, receiving responses, and/or a combination thereof, among other examples. The active session may continue until a planned end time. Alternatively, the active session may be paused in accordance with one or more constraints (e.g., a GNSS conflict, a physical layer condition constraint, and/or a combination thereof, among other examples). The session suspend operation may occur at the planned end time or the occurrence of one or more constraints. For the session suspend operation, the continuous wave may be disabled. If the one or more RFID sessions and/or RFID sub-sessions are complete, the results (e.g., responses from the one or more RFID tags 510) may be reported to an upper layer and the one or more RFID sessions and/or RFID sub-sessions may be ended. If the one or more RFID sessions and/or RFID sub-sessions are still pending, and there is no upper layer indication or command to abort, nor an indication that a WWAN tuneaway is starting, the reader 505 may initiate the preparation session to schedule a subsequent session. If a WWAN tuneaway is starting, the reader 505 may wait in a suspend stage until the WWAN tuneaway has finished. If an upper layer abort command and/or indication was received, the reader 505 may end the one or more RFID sessions and/or RFID sub-sessions and report results to the upper layer.

In some aspects, to perform the planning session discussed above, the reader 505 may determine the total RFID operation time ($T_{Nominal}$) in accordance with a Q value for an inventory search. For example, if the total RFID operation time is 500 ms, the value for $T_{Nominal}$ (e.g., 500 ms) may be provided as input to a frequency hopping step, and the reader 505 may determine that channel availability for frequency hopping is limited to 350 ms. The channel availability for frequency hopping (e.g., 350 ms) may be provided as input to the WWAN tuneaway step, where the reader 505 may determine that 200 ms is available before the next WWAN tuneaway to WAN. The time available before the next WWAN tuneaway (e.g., 200 ms) may be provided to a simultaneous transmission step (with an outer loop align preference set as FALSE for an upcoming WWAN tuneaway), and the reader 505 may determine a final transmission power and duration that may be valid until a time to a next outer loop (e.g., 400 ms). The reader 505 may perform a final evaluation to determine if an immediate session start is possible for 150 ms, and if so, perform a radio frequency tune and activate the one or more RFID sessions and/or RFID sub-sessions. When the scheduled session ends (e.g., after 150 ms), transmission and/or reception functionality may be disabled to allow the RFID tags 510 to remain in a simultaneous transmission mode and/or meet regulatory compliance obligations. When a WAN tuneaway occurs, the reader 505 may resume the one or more RFID sessions and/or RFID sub-sessions until, for example, an upper layer procedure is finished.

In some aspects, such as if the frequency hopping step returns a wait time of 300 ms, the reader 505 may proceed with a tuneaway and simultaneous transmission steps. The reader 505 may determine that the next tuneaway will occur in 400 ms. If a simultaneous transmission step may provide a 50 ms grant for $T_{min}$, $T_{Nominal}$, and/or $Tx_{PowerPreference}$, and the grant is valid until a next outer loop in, for example, 450 ms, the reader 505 may evaluate a sleep duration of 300 ms and a duration for the one or more RFID sessions and/or RFID sub-sessions of 50 ms after waking from the sleep cycle (e.g., when the frequency hopping channel becomes available). When the wakeup has occurred and the one or more RFID sessions and/or RFID sub-sessions are complete, transmission and/or reception functionality may be disabled to allow the RFID tags 510 to remain in compliance with simultaneous transmission and/or one or more regulations. When a tuneaway to WAN occurs, the reader 505 may continue the one or more RFID sessions and/or RFID sub-sessions until an upper layer procedure has completed.

As indicated above, FIG. 5 is provided as an example. Other examples may differ from what is described with respect to FIG. 5.

FIG. 6 is a flowchart of an example process 600 associated with a unit operation for RFID tag communication, in accordance with the present disclosure. In some aspects, one or more process blocks of FIG. 6 are performed by a reader (e.g., reader 505). In some aspects, one or more process blocks of FIG. 6 are performed by another device or a group of devices separate from or including the reader, such as a user device (e.g., user device 110), a wireless communication device (e.g., wireless communication device 120), and/ or one or more RFID tags (e.g., one or more RFID tags 510). Additionally, or alternatively, one or more process blocks of FIG. 6 may be performed by one or more components of device 200, such as processor 210, memory 215, input component 220, output component 225, and/or communication component 230.

As shown in FIG. 6, process 600 may include transmitting, to one or more RFID tags, a continuous wave in accordance with a unit operation, wherein the unit operation is associated with one or more of an amount of time or a number of unit steps associated with one or more RFID sessions or one or more RFID sub-sessions (block 610). For example, the reader may transmit, to one or more RFID tags, a continuous wave in accordance with a unit operation, wherein the unit operation is associated with one or more of an amount of time or a number of unit steps associated with one or more RFID sessions or one or more RFID sub-sessions, as described above.

As further shown in FIG. 6, process 600 may include receiving, from each of the one or more RFID tags, a response during the unit operation (block 620). For example, the reader may receive, from each of the one or more RFID tags, a response during the unit operation, as described above.

Process 600 may include additional aspects, such as any single aspect or any combination of aspects described below and/or in connection with one or more other processes described elsewhere herein.

In a first aspect, the unit operation is associated with a radio frequency table configuration.

In a second aspect, alone or in combination with the first aspect, the unit operation includes a time period for retransmissions.

In a third aspect, alone or in combination with one or more of the first and second aspects, the unit operation includes a time period for transmitting a select command.

In a fourth aspect, alone or in combination with one or more of the first through third aspects, the unit operation is associated with a radio frequency mode.

In a fifth aspect, alone or in combination with one or more of the first through fourth aspects, the unit operation is a sum of multiple time periods, where each of the multiple time periods is associated with the one or more RFID sessions or the one or more RFID sub-sessions.

In a sixth aspect, alone or in combination with one or more of the first through fifth aspects, process 600 includes determining one or more radio frequency parameters, and determining the amount of time or the number of unit steps for the unit operation in accordance with the one or more radio frequency parameters.

In a seventh aspect, alone or in combination with one or more of the first through sixth aspects, process 600 includes determining the amount of time or the number of unit steps for the one or more RFID sessions or the one or more RFID sub-sessions.

In an eighth aspect, alone or in combination with one or more of the first through seventh aspects, process 600 includes determining a desired transmission power in accordance with one or more physical layer conditions.

In a ninth aspect, alone or in combination with one or more of the first through eighth aspects, process 600 includes determining a transmission frequency and a dwell time.

In a tenth aspect, alone or in combination with one or more of the first through ninth aspects, process 600 includes determining a final duration and a transmission power for the unit operation.

In an eleventh aspect, alone or in combination with one or more of the first through tenth aspects, the one or more RFID sessions or the one or more RFID sub-sessions include one or more of a single tag inventory search, a multi-tag inventory search, a single tag access procedure, or a multi-tag access procedure.

In a twelfth aspect, alone or in combination with one or more of the first through eleventh aspects, the unit operation is associated with one or more of a frequency hopping constraint, a global navigation satellite system constraint, a physical layer constraint, a throughput constraint, a wireless wide area network constraint, a transmission power constraint, or a thermal constraint.

In a thirteenth aspect, alone or in combination with one or more of the first through twelfth aspects, the unit operation is associated with a tag state for each of the one or more RFID tags.

In a fourteenth aspect, alone or in combination with one or more of the first through thirteenth aspects, the unit operation is associated with one or more radio frequency parameters.

In a fifteenth aspect, alone or in combination with one or more of the first through fourteenth aspects, the one or more radio frequency parameters include one or more of a backscatter link frequency, a time reference interval, or a modulation index.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

Figure 7:
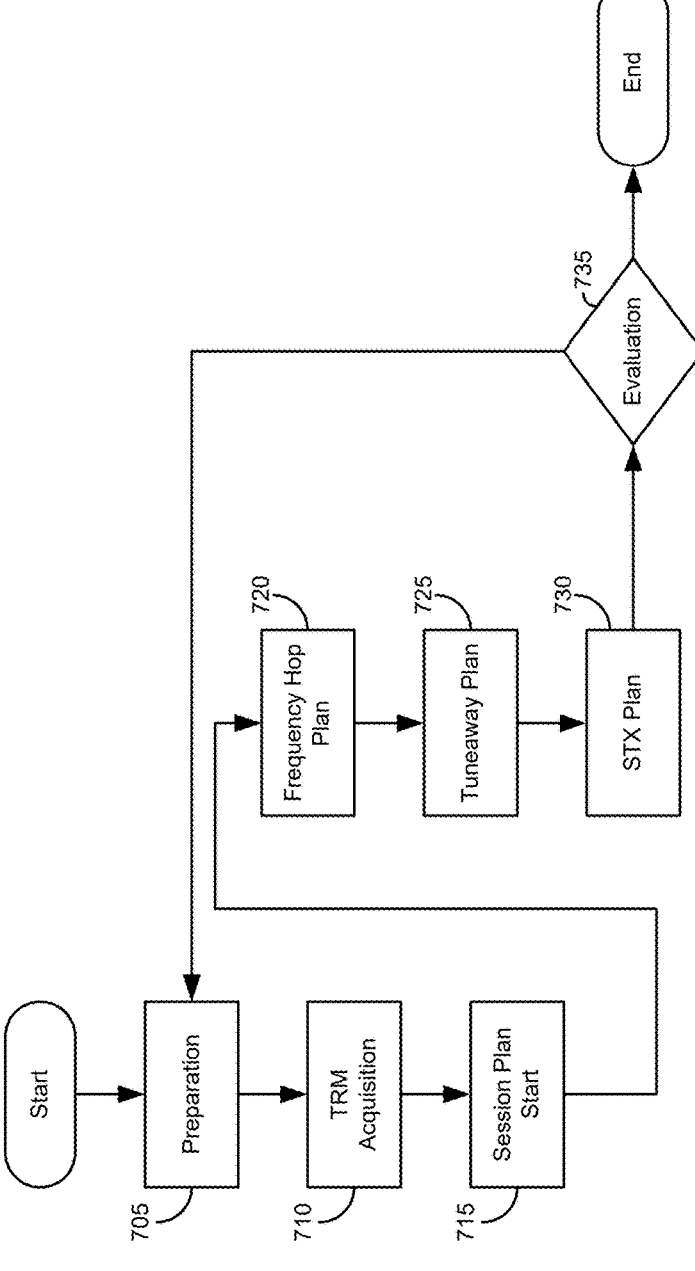
FIG. 7 is a diagram illustrating an example associated with session planning, in accordance with the present disclosure.

FIG. 7 is a diagram illustrating an example 700 associated with session planning, in accordance with the present disclosure. In some aspects, the session planning of the example 700 may be performed by the reader (e.g., reader 505). As shown in FIG. 7, the session planning may include a preparation phase 705, a TRM acquisition phase 710, a session plan start phase 715, a frequency hop plan phase 720, a tuneaway plan phase 725, a simultaneous transmission plan (STx plan) phase 730, and an evaluation phase 735.

The preparation phase 705 may include adjusting one or more radio frequency mode parameters for physical layer conditions, determining one or more GNSS conflicts, calculating $T_{min}$, $T_{nominal}$, and a transmission power preference. The TRM acquisition phase 710 may include waiting for a TRM grant. Waiting for the TRM grant may indicate no WWAN conflicts. The session plan start phase 715 may include determining and outputting a session transmission power and a session duration time in accordance with one or more of $T_{min}$, $T_{nominal}$, and the transmission power preference.

The frequency hop phase 720 may include determining if a $T_{bar}$ timer has elapsed. If the $T_{bar}$ timer has elapsed, an available time ($T_{available}$) until a next frequency hop may be returned. If the $T_{bar}$ timer has not elapsed, a frequency hop wait time may be returned, $T_{nominal}$ may be used as the available time until the next frequency hop. The values for $T_{min}$ and $T_{available}$ may be output as a result of the frequency hop plan phase 720.

The tuneaway plan phase 725 may include determining if a tuneaway is in progress (e.g., the tuneaway has started but not completed) or if a tuneaway is upcoming (e.g., expected to start within a defined or configured amount of time). For a tuneaway that is in progress or is upcoming, the tuneaway plan phase 730 may include waiting for the tuneaway to end.

For a tuneaway is not in progress and is not upcoming, the tuneaway plan phase 725 may include outputting an indication that the tuneaway is not in progress and is not upcoming (e.g., $TA_{upcoming}$=FALSE). In some aspects, an output of the tuneaway plan phase 730 may include $T_{min}$, $T_{available}$, the transmission power preference, an open loop alignment preference (e.g., FALSE for an upcoming tuneaway or if a frequency hop is in $T_{bar}$), and/or a combination thereof, among other examples.

The STx plan phase 730 may include determining whether a current transmission budget can support pending simultaneous transmission requests. If the current transmission budget can support the pending simultaneous transmission requests, an output of the STx plan phase 730 may include $T_{min}$, $T_{available}$, the open loop alignment preference, and a transmission power level preference. When the current transmission budget cannot support the pending simultaneous transmission requests, an output of the STx plan phase 730 may include determining and outputting a simultaneous transmission wait time (e.g., T_stx_wait_time).

The evaluation phase 735 may include determining whether $T_{available}$ is greater than or equal to $T_{min}$ and/or whether a session duration time is greater than or equal to $T_{min}$. When $T_{available}$ is greater than or equal to $T_{min}$ and the session duration time is greater than or equal to $T_{min}$, the reader may proceed with RF tuning and/or the RFID session or RFID subsession. When $T_{available}$ is not greater than or equal to $T_{min}$ or the session duration time is not greater than or equal to $T_{min}$, the reader may return to the preparation phase 705. In some aspects, before proceeding with RF tuning and/or the RFID session or RFID subsession, or before returning to the preparation phase 705, the reader may determine whether to enter a sleep mode before a subsequent RFID session or RFID subsession begins. If the reader is able to enter the sleep mode before the subsequent RFID session or RFID subsession, the reader may transition to the sleep mode. Transitioning to the sleep mode may include the reader ceasing transmission of the continuous wave, which may end any RFID sessions with the one or more RFID tags. In some aspects, the reader may subsequently transition from the sleep mode to an active mode. When in the active mode, the reader may plan a subsequent RFID session or subsession and output the continuous wave to initiate the subsequent RFID session or subsession with the one or more RFID tags.

As indicated above, FIG. 7 is provided as an example. Other examples may differ from what is described with respect to FIG. 7.

FIG. 8 is a diagram illustrating an example 800 associated with an example RFID session with constraints, in accordance with the present disclosure. As shown in the example 800 of FIG. 8, the reader (e.g., reader 510) may determine a transmission budget in accordance with a funnel algorithm 805. For example, as shown by reference number 810, the reader may determine that $T_{available}$ for frequency hopping is 350 ms. As shown by reference number 815, the reader may determine that $T_{available}$ for the tuneaway is 200 ms. As shown by reference number 820, the reader may determine that $T_{available}$ for the simultaneous transmission is 150 ms and a transmission power is 25 dB. Accordingly, as shown by reference number 825, the reader may determine the final budget is 150 ms for $T_{available}$ with a transmission budget power of 25 dB. Accordingly, as shown by reference number 825, the reader may perform an RFID session for 150 ms before disabling the one or more RFID tags (e.g., one or more RFID tags 510).

As shown by reference number 830, the reader may begin the RFID session or RFID subsession 845 after session planning 835 (e.g., the session planning of example 700 of FIG. 7) and after radio frequency tuning and transmission of the continuous wave 840. In some aspects, as shown by reference number 850, the reader may disable transmission and/or reception at the one or more RFID tags after the RFID session or RFID subsession 845 ends to, for example remain in compliance with one or more simultaneous transmission regulations and/or other regulations. At the tuneaway start time, the reader may initiate the tuneaway to WWAN as shown by reference number 855. After the tuneaway to WWAN shown by reference number 855 ends, the reader may initiate the session planner to continue one or more RFID sessions or RFID subsessions until one or more upper layer procedures are completed.

As indicated above, FIG. 8 is provided as an example. Other examples may differ from what is described with respect to FIG. 8.

Figure 9:
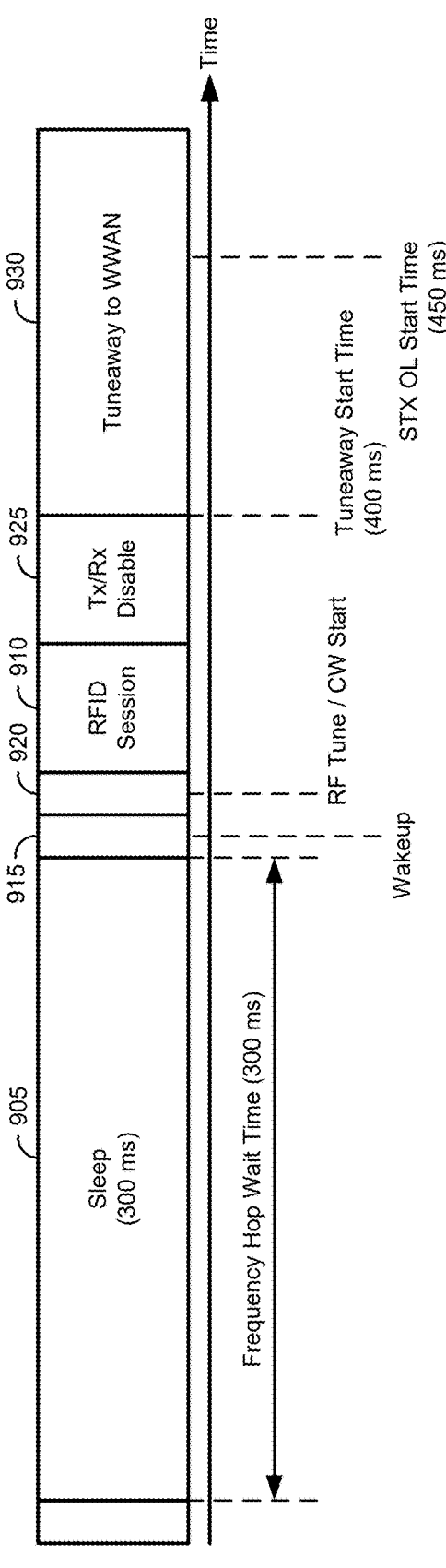
FIG. 9 is a diagram illustrating an example associated with RFID session or RFID subsession planning subject to one or more constraints, in accordance with the present disclosure.

FIG. 9 is a diagram illustrating an example 900 associated with RFID session or RFID subsession planning subject to one or more constraints, in accordance with the present disclosure. In the example 900, the RFID session or RFID subsession planning occurs without a funnel algorithm (e.g., the funnel algorithm 805 of FIG. 8). In one example, the reader may determine that the tuneaway start time begins in 400 ms and a simultaneous transmission grant is 50 ms with a transmission power preference of of 33 dB. The reader may further determine that the next outer loop begins in 450 ms. Accordingly, the reader may schedule a sleep duration of 300 ms, as shown by reference number 905, and an RFID session or RFID subsession for 50 ms, as shown by reference number 910, for after the reader transitions from a sleep state to an active state (reference number 915) and after radio frequency tuning and the continuous wave are transmitted, as shown by reference number 920. In some aspects, as shown by reference number 925, the reader may disable transmission and/or reception at the one or more RFID tags after the RFID session or RFID subsession 910 ends to, for example remain in compliance with one or more simultaneous transmission regulations and/or other regulations. At the tuneaway start time, the reader may initiate the tuneaway to WWAN as shown by reference number 930. After the tuneaway to WWAN shown by reference number 930 ends, the reader may initiate the session planner to continue one or more RFID sessions or RFID subsessions until one or more upper layer procedures are completed.

As indicated above, FIG. 9 is provided as an example. Other examples may differ from what is described with respect to FIG. 9.

The following provides an overview of some Aspects of the present disclosure:

Aspect 1: A method of wireless communication performed by a reader, comprising: transmitting, to one or more RFID tags, a continuous wave in accordance with a unit operation, wherein the unit operation is associated with one or more of an amount of time or a number of unit steps associated with one or more RFID sessions or one or more RFID sub-sessions; and receiving, from each of the one or more RFID tags, a response during the unit operation.

Aspect 2: The method of Aspect 1, wherein the unit operation is associated with a radio frequency table configuration.

Aspect 3: The method of any of Aspects 1-2, wherein the unit operation includes a time period for retransmissions.

Aspect 4: The method of any of Aspects 1-3, wherein the unit operation includes a time period for transmitting a select command.

Aspect 5: The method of any of Aspects 1-4, wherein the unit operation is associated with a radio frequency mode.

Aspect 6: The method of any of Aspects 1-5, wherein the unit operation is a sum of multiple time periods, wherein each of the multiple time periods is associated with the one or more RFID sessions or the one or more RFID sub-sessions.

Aspect 7: The method of any of Aspects 1-6, further comprising: determining one or more radio frequency parameters; and determining the amount of time or the number of unit steps for the unit operation in accordance with the one or more radio frequency parameters.

Aspect 8: The method of any of Aspects 1-7, further comprising determining the amount of time or the number of unit steps for the one or more RFID sessions or the one or more RFID sub-sessions.

Aspect 9: The method of any of Aspects 1-8, further comprising determining a desired transmission power in accordance with one or more physical layer conditions.

Aspect 10: The method of any of Aspects 1-9, further comprising determining a transmission frequency and a dwell time.

Aspect 11: The method of any of Aspects 1-10, further comprising determining a final duration and a transmission power for the unit operation.

Aspect 12: The method of any of Aspects 1-11, wherein the one or more RFID sessions or the one or more RFID sub-sessions include one or more of: a single tag inventory search; a multi-tag inventory search; a single tag access procedure; or a multi-tag access procedure.

Aspect 13: The method of any of Aspects 1-12, wherein the unit operation is associated with one or more of a frequency hopping constraint, a global navigation satellite system constraint, a physical layer constraint, a throughput constraint, a wireless wide area network constraint, a transmission power constraint, or a thermal constraint.

Aspect 14: The method of any of Aspects 1-13, wherein the unit operation is associated with a tag state for each of the one or more RFID tags.

Aspect 15: The method of any of Aspects 1-14, wherein the unit operation is associated with one or more radio frequency parameters.

Aspect 16: The method of Aspect 15, wherein the one or more radio frequency parameters include one or more of a backscatter link frequency, a time reference interval, or a modulation index.

Aspect 17: A system configured to perform one or more operations recited in one or more of Aspects 1-16.

Aspect 18: An apparatus comprising means for performing one or more operations recited in one or more of Aspects 1-16.

Aspect 19: A non-transitory computer-readable medium storing a set of instructions, the set of instructions comprising one or more instructions that, when executed by a device, cause the device to perform one or more operations recited in one or more of Aspects 1-16.

Aspect 20: A computer program product comprising instructions or code for executing one or more operations recited in one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A reader for wireless communication, comprising:
one or more memories; and
one or more processors, coupled to the one or more memories, configured to cause the reader to:
transmit, to one or more radio frequency identifier (RFID) tags, a continuous wave in accordance with a unit operation, wherein the unit operation is associated with one or more of an amount of time or a number of unit steps associated with one or more RFID sessions or one or more RFID sub-sessions, and wherein the unit operation is defined such that, upon interruption of an RFID operation after completion of the unit operation, the one or more RFID tags are not left in an unknown state, an undefined state, or an unrecoverable state; and
receive, from each of the one or more RFID tags, a response during the unit operation.

2. The reader of claim 1, wherein the unit operation is associated with a radio frequency table configuration.

3. The reader of claim 1, wherein the unit operation includes a time period for retransmissions.

4. The reader of claim 1, wherein the unit operation includes a time period for transmitting a select command.

5. The reader of claim 1, wherein the unit operation is associated with a radio frequency mode.

6. The reader of claim 1, wherein the unit operation is a sum of multiple time periods, wherein each of the multiple time periods is associated with the one or more RFID sessions or the one or more RFID sub-sessions.

7. The reader of claim 1, wherein the one or more processors are further configured to cause the reader to:
determine one or more radio frequency parameters; and
determine the amount of time or the number of unit steps for the unit operation in accordance with the one or more radio frequency parameters.

8. The reader of claim 1, wherein the one or more processors are further configured to cause the reader to determine the amount of time or the number of unit steps for the one or more RFID sessions or the one or more RFID sub-sessions.

9. The reader of claim 1, wherein the one or more processors are further configured to cause the reader to determine a desired transmission power in accordance with one or more physical layer conditions.

10. The reader of claim 1, wherein the one or more processors are further configured to cause the reader to determine a transmission frequency and a dwell time.

11. The reader of claim 1, wherein the one or more processors are further configured to cause the reader to determine a final duration and a transmission power for the unit operation.

12. The reader of claim 1, wherein the one or more RFID sessions or the one or more RFID sub-sessions include one or more of:
a single tag inventory search;
a multi-tag inventory search;
a single tag access procedure; or
a multi-tag access procedure.

13. The reader of claim 1, wherein the unit operation is associated with one or more of a frequency hopping constraint, a global navigation satellite system constraint, a physical layer constraint, a throughput constraint, a wireless wide area network constraint, a transmission power constraint, or a thermal constraint.

14. The reader of claim 1, wherein the unit operation is associated with a tag state for each of the one or more RFID tags.

15. The reader of claim 1, wherein the unit operation is associated with one or more radio frequency parameters.

16. The reader of claim 15, wherein the one or more radio frequency parameters include one or more of a backscatter link frequency, a time reference interval, or a modulation index.

17. A method of wireless communication performed by a reader, comprising:

transmitting, to one or more radio frequency identifier (RFID) tags, a continuous wave in accordance with a unit operation, wherein the unit operation is associated with one or more of an amount of time or a number of unit steps associated with one or more RFID sessions or one or more RFID sub-sessions, and wherein the unit operation is defined such that, upon interruption of an RFID operation after completion of the unit operation, the one or more RFID tags are not left in an unknown state, an undefined state, or an unrecoverable state; and receiving, from each of the one or more RFID tags, a response during the unit operation.

18. The method of claim 17, further comprising:

determining one or more radio frequency parameters; and determining the amount of time or the number of unit steps for the unit operation in accordance with the one or more radio frequency parameters.

19. The method of claim 17, further comprising determining one or more of:

the amount of time or the number of unit steps for the one or more RFID sessions or the one or more RFID sub-sessions;

a desired transmission power in accordance with one or more physical layer conditions;

a transmission frequency and a dwell time; or a final duration and a transmission power for the unit operation.

20. An apparatus for wireless communication, comprising:

means for transmitting, to one or more radio frequency identifier (RFID) tags, a continuous wave in accordance with a unit operation, wherein the unit operation is associated with one or more of an amount of time or a number of unit steps associated with one or more RFID sessions or one or more RFID sub-sessions, and wherein the unit operation is defined such that, upon interruption of an RFID operation after completion of the unit operation, the one or more RFID tags are not left in an unknown state, an undefined state, or an unrecoverable state; and means for receiving, from each of the one or more RFID tags, a response during the unit operation.

* * * * *